United States Patent
Kochsiek (12)

(10) Patent No.: US 6,428,253 B1
(45) Date of Patent: Aug. 6, 2002

(54) DEVICE FOR FASTENING A TOOL ON A DRIVEABLE TOOL SPINDLE OF A MACHINE TOOL IN A PROGRESSIVELY ADJUSTABLE MANNER

(75) Inventor: Guido Kochsiek, Leopoldshöhe (DE)

(73) Assignee: Iprotec Maschinen-und Edelstahlprodukte GmbH (DE)

( * ) Notice: Subject to any disclaimer, the term of this patent is extended or adjusted under 35 U.S.C. 154(b) by 0 days.

(21) Appl. No.: 09/555,942

(22) PCT Filed: Dec. 2, 1998

(86) PCT No.: PCT/EP98/07842
§ 371 (c)(1),
(2), (4) Date: Jul. 31, 2000

(87) PCT Pub. No.: WO99/29468
PCT Pub. Date: Jun. 17, 1999

(30) Foreign Application Priority Data

Dec. 6, 1997 (EP) .............................. 97121488

(51) Int. Cl.⁷ .......................... B23C 1/12; B23B 27/00
(52) U.S. Cl. .................. 409/201; 82/158; 408/147; 409/211
(58) Field of Search ................. 409/201, 211, 409/234, 233, 216; 408/156, 239 R, 239 A, 147, 180, 12; 483/18, 30, 13; 29/26 R, 27 R, 26 A, 27 C; 182/1.11, 158

(56) References Cited

U.S. PATENT DOCUMENTS

| | | | |
|---|---|---|---|
| 2,483,096 A | | 9/1949 | Keine |
| 3,749,508 A | * | 7/1973 | Schukrafft .................. 408/156 |
| 4,439,075 A | * | 3/1984 | Wiederkehr ............. 408/239 R |
| 4,979,852 A | * | 12/1990 | Noggle ........................ 408/156 |

FOREIGN PATENT DOCUMENTS

FR    459 327    6/1913

* cited by examiner

Primary Examiner—William Briggs
(74) Attorney, Agent, or Firm—Cantor Colburn LLP

(57) ABSTRACT

The invention concerns a device for infinitely variable support of a tool on a drivable tool spindle of a machine tool. To provide such a device which allows exact adjustment of the tool within a range of one millimetre, at the same time avoiding centrifugal force-related imbalances, it is proposed that the tool is exchangeably attached to a tool carrier which is mounted in a housing so as to be pivotable about an axis of rotation of the tool carrier extending at an angle, preferably at a right angle, to the axis of rotation of the tool spindle.

7 Claims, 1 Drawing Sheet

DEVICE FOR FASTENING A TOOL ON A DRIVEABLE TOOL SPINDLE OF A MACHINE TOOL IN A PROGRESSIVELY ADJUSTABLE MANNER

TECHNICAL FIELD

The invention concerns a device for holding a tool so that it is continuously adjustable on a spindle that can be driven on a tooling machine, wherein the tool is attached to a tool holder so it can be changed. The tool holder is mounted in a housing so it can swivel on the axis of rotation of the tool holder, which runs at an angle, preferably a right angle, to the axis of rotation of the tool spindle.

BACKGROUND OF THE INVENTION

In practice, so-called flat turntables for continuous adjustment of the tool holder on a tooling machine, for example a tool rest, are known. These flat turntables have a slide moved by translation whereby the tool can be moved on the workpiece. To equalize the imbalances caused by centrifugal force that occur when the table is moved, the known flat turntables have equalization with a table going the other way or with counterweights.

The disadvantage of these known devices for holding a tool so it is continuously adjustable on a spindle of a tooling machine is that, on one hand, only a translational movement of the tool can take place and, on the other hand, because of the remaining imbalances and centrifugal forces, continuous adjustment is not possible in the $\mu$m range at high tooling rpm.

Another way of continuously adjusting a tool holder is shown in FR 459 327. This publication shows a tool holder with all the features in the preamble, as it is formulated in claim 1.

Here, the tool holder is swiveled by turning a set screw whose threads come in contact with a threaded section molded on one end of a tool holder mounted so it can swivel in a housing.

This type of adjustment option has the disadvantage that it must be activated manually and the tooling machine must be stopped completely for this. Also, it is difficult to get the position required for adjustment in the $\mu$m range with such a manually activated adjustment screw.

SUMMARY OF THE INVENTION

The problem of the invention is to create a device for holding a tool so that it is continuously adjustable on a spindle that can be driven on a tooling machine that makes it possible to adjust the tool in the $\mu$m range in many ways with almost complete equalization of the imbalances caused by centrifugal force.

The solution to this problem in the invention is characterized by the fact that the tool holder can be swiveled in the housing by a motor, magnetically or by a pressurized drive.

Swiveling the tool holder on an axis that intersects the axis of rotation of the tool spindle at an angle, preferably a right angle, makes it possible to equalize the masses of the tool holder and the tool lying on both sides of the swivel axes in such a way that the mass center of gravity lies at the point of intersection of the swivel axis and the axis of rotation, so that when the tool holder mounted adjustably in the housing rotates, no imbalance occurs due to centrifugal force. Only because of this prevention of imbalances due to centrifugal force is it possible to adjust the tool holder and thus the tool finely in such a way that changes in movement are possible in the $\mu$m range, which is in turn the precondition for continuous adjustment, especially by CNC control.

Because of the swivel mounting of the tool holder, it is also possible with the device in the invention to make not only purely translational movements of the tool.

The invention proposes that the tool holder can be swiveled in the housing by a motor, magnetically or by a pressurized drive. In one preferred form of embodiment of the invention, the tool holder has a swivel piston which is arranged in a cylinder chamber of the housing and can be activated on opposite sides with a pressure medium. This design as a pressure-activated swivel piston permits very fine, easy swiveling of the tool holder at high force by recirculating the pressure medium.

In one practical form of embodiment of the tool holder with a swivel piston, the tool holder is designed like a disk with swivel pistons molded in the form of an annular section, which is arranged in an annular section-shaped cylinder chamber of the housing. In this form of embodiment, the annular-section-shaped swivel piston is the counterweight to the actual tool holder plus tool, so that there is in turn an equalization of masses.

The invention also proposes that the generating surfaces and front surfaces of the tool holder and the swivel piston be designed as leading surfaces opposite the housing. In this design, the generating surfaces and front surfaces represent sealing surfaces at the same time, if a drive with a pressure medium is provided as the drive for the swivel piston.

To allow the tool holder, and hence the tool, to be adjusted with no play and perfect translation, in one preferred form of embodiment of the invention, a direct measurement system is arranged between the housing and the tool holder. In this context, direct means that the measurement system directly records the adjustment of the tool holder with no intermediate connection of other transmission elements.

Finally, the invention proposes that the tool be attached and detachable, so that it cannot turn on the tool holder by means of a repeating precision fast-change system. Using such a fast-change system ensures that, on one hand, the tool can be changed fully automatically without long idle times and, on the other hand, the repeating precision, non-turning attachment of the tool guarantees that because of the known tool geometries, the tooling can be continued with no realignment or measurement of the tool.

According to one practical form of embodiment of the invention, gaseous and/or liquid media can be added to the fast-change tool system and/or the tool through the tool holder for cooling, cutting and cleaning purposes. These gaseous and/or liquid media can be, for example, compressed air for cleaning, lubricating oil for cutting and cooling, or nitrogen for cooling.

BRIEF DESCRIPTION OF THE DRAWINGS

Other features and advantages of the invention can be seen from the following description of the attached drawings, which shows the design of one example of embodiment of the device in the invention for holding a tool so it is continuous adjustable on a spindle that can be driven on a tooling machine. The drawings show.

DETAILED DESCRIPTION OF THE INVENTION

Figure 1:
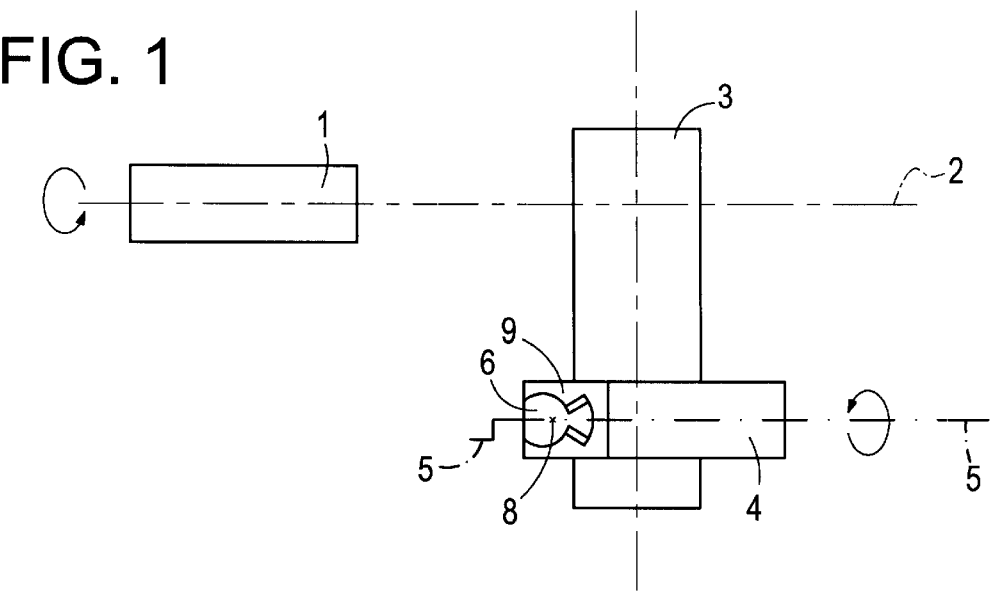
FIG. 1 a schematic construction of a machine tool with workpiece spindle and tool spindle offset with parallel axis and FIG. 2 a schematic top view of infinitely variable support of a tool according to the invention.

In FIG. 1 is shown schematically the basic construction of a machine tool. The machine tool, not shown in more detail, with chucking for at least one workpiece comprises a drivable workpiece spindle 1 by which the workpiece is turned about a workpiece axis of rotation 2. The machine tool further includes a carriage 3 by which a tool spindle 4 is movable both radially to the axis of rotation 2 of the workpiece and axially in the longitudinal direction of the axis of rotation 2 of the workpiece, wherein the tool spindle 4 is driven in rotation about an axis of rotation 5 of the tool spindle.

As can further be seen from FIG. 1, the tool spindle 4 comprises a tool carrier 6 to which is non-rotatably attached an exchangeable tool 7. This tool carrier 6 is mounted in a housing 9 so as to be pivotable about an axis of rotation 8 of the tool carrier running at an angle to the axis of rotation 5 of the tool spindle.

Due to the pivotable mounting of the tool carrier 6 in the housing 9 of the tool spindle 4, with a machine tool constructed in this way it is possible to move the tool 7 not only translationally by adjustment of the tool spindle 4 by the carriage 3 towards the axis of rotation 2 of the workpiece, but furthermore also to pivot the tool 7 relative to the axis of rotation 2 of the workpiece.

Figure 2:
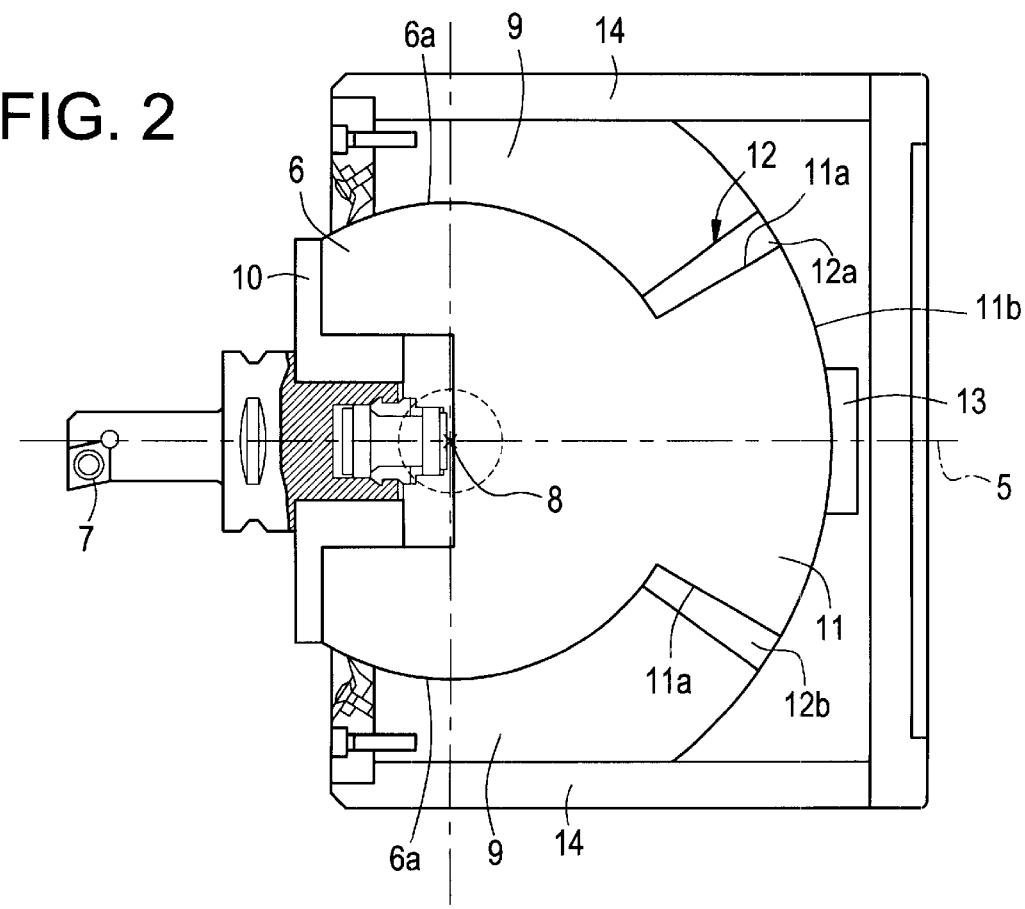

The more detailed construction of the tool carrier 6 is shown schematically in FIG. 2. To support the tool 7, the tool carrier 6 comprises a quick-change system 10 in which the tools 7 to be used each time can be fixed non-rotatably and with accurate repetition. Fixing the tools 7 with accurate repetition is indispensable for constant accuracy of machining, as the geometrical dimensions of each tool 7 go as starting values into the computer-controlled machining programmes of the machine tool. Therefore in spite of the known geometry of the tool 7 used, unusable workpieces would be produced by inaccurate placing of a tool 7 on the tool carrier 6, as the tool 7 would not be positioned in the correct position relative to the axes of rotation 2, 5 and 8.

In the embodiment shown of a device for infinitely variable support of a tool 7 on a drivable tool spindle 4 of a machine tool, the tool carrier 6 is provided with a pivot piston 11 which, arranged in a cylinder chamber 12 of the housing 9, can admit fluid for pivoting the tool carrier 6. The tool carrier 6 constructed after the fashion of a disc with the integrally formed pivot piston 11 in the form of a ring section is pivotable about the axis of rotation 8 of the tool carrier, which runs at right angles to the axis of rotation 5 of the tool spindle in the embodiment shown.

The tool carrier 6 is pivoted by the fact that a fluid is introduced via supply means, not shown in more detail, into the also ring section-shaped cylinder chamber 12. When the fluid is pumped round from one compartment 12a to the other compartment 12b of the cylinder chamber 12, a different pressure is applied to the end faces 11a of the pivot piston 11, so that the pivot piston 11 is pivoted about the axis of rotation 8 of the tool carrier.

The lateral surfaces 6a and 11a of the tool carrier 6 and of the pivot piston 11 and also the end faces 11a of the pivot piston 11 serve in the embodiment shown as guide surfaces relative to the housing 9. At the same time these surfaces 6a, 11a and 11b serve as sealing surfaces for the fluid introduced into the cylinder chamber. In order to achieve mounting of the tool carrier 6 in the housing 9 with as little friction as possible, it is possible to provide at least the lateral surfaces 6a and 11b of the tool carrier 6 and of the pivot piston 11 with a coating which reduces frictional resistance.

By arranging a direct measuring system 13 between the housing 9 and the tool carrier 6 it is possible to measure the degree of pivoting of the tool carrier 6 without play and without transmission error. The direct measuring system 13 can for example consist of a measuring strip which is arranged on the lateral surface 11b of the pivot piston 11 and which is scanned directly by a scanning system arranged in the housing 9.

By pivoting the tool carrier 6 about the axis of rotation 8 of the tool carrier which intersects the axis of rotation 5 of the tool spindle at an angle, preferably a right angle, the possibility arises of equalising the masses of the tool carrier and tool 7 located on both sides of the axis of rotation 8 of the tool carrier in such a way that the mass centre of gravity lies on the point of intersection of the axis of rotation 8 of the tool carrier and the axis of rotation 5 of the tool spindle. On rotation of the tool carrier 6 mounted adjustably in the housing 9, therefore, owing to the centrifugal force there is no imbalance which would make exact guiding of the tool 7 impossible.

Only because of this avoidance of centrifugal force-related imbalances is it possible to adjust the tool carrier 6 and the tool 7 so sensitively that changes of movement within a range of one millimetre are possible.

For further compensation of the centrifugal forces occurring at speeds of the axis of rotation 5 of the tool spindle of well over 15,000 revolutions per minute, the housing 9 can be surrounded by an outer pressure sleeve 14, as is the case in the embodiment shown.

Naturally the device described above for infinitely variable support of a tool 7 can be used on any kind of machining stations, not just on lathes, as is the case in the embodiment shown.

List of reference numbers 1 workpiece spindle
2 axis of rotation of workpiece
3 carriage
4 tool spindle
5 axis of rotation of tool spindle
6 tool carrier
6a lateral surface
7 tool
8 axis of rotation of tool carrier
9 housing
10 quick-change system
11 pivot piston
11a end face
11b lateral surface
12 cylinder chamber
12a compartment
12b compartment
13 measuring system
14 pressure sleeve

What is claimed is:

1. A device for holding a tool so it is continuously adjustable on a spindle that can be driven on a tooling machine, wherein the tool is attached to a tool holder so that it can be changed, and the tool holder is mounted so that it can swivel in a housing on the axis of rotation of the tool holder which runs at an angle to the axis of rotation of the tool spindle, wherein the tool holder can be swiveled in the housing by a motor, magnetically or by a pressurized drive and wherein the tool holder has a swivel piston which is arranged in a cylinder chamber of the housing and can be activated on opposite sides with a pressure medium.

2. The device according to claim 1, wherein the tool holder is designed like a disk with swivel pistons molded in the form of an annular section, which is sealed in an annular cylinder chamber of the housing.

3. The device according to claim 2, wherein the generating surfaces and front surfaces of the tool holder and the swivel piston are designed as guide surfaces opposite the housing.

4. The device according to claim 1, wherein a direct measurement system is arranged between the housing and the tool holder.

5. The device according to claim 1, wherein the tool is attached and can be detached by means of a repeating precision fast-change system so that it cannot turn on the tool holder.

6. The device according to claim 5, wherein gaseous and/or liquid media can be added to the fast-change system and/or the tool through the tool holder.

7. The device according to claim 1, wherein the axis of rotation of the tool holder runs at a right angle to the axis of rotation of the tool spindle.

* * * * *

UNITED STATES PATENT AND TRADEMARK OFFICE
CERTIFICATE OF CORRECTION

PATENT NO. : 6,428,253 B1
DATED : August 6, 2002
INVENTOR(S) : Guido Kochsiek

It is certified that error appears in the above-identified patent and that said Letters Patent is hereby corrected as shown below:

Title page, Item [54] and Column 1, line 1,
Title, delete "DEVICE FOR FASTENING A TOOL ON A DRIVEABLE TOOL SPINDLE OF A MACHINE TOOL IN A PROGRESSIVELY ADJUSTABLE MANNER" and insert -- DEVICE FOR HOLDING A TOOL SO IT CAN BE CONTINUOUSLY ADJUSTED ON A SPINDLE THAT CAN BE DRIVEN ON A TOOLING MACHINE --.

Tilte page,
Item [56], References Cited, U.S. PATENT DOCUMENTS, insert the following:
-- 2,412,038   12/1946   Freisen         408/156
   2,734,402   2/1956    Hoern           408/147
   3,740,161   6/1973    Milowski        408/12
   4,097,175   6/1978    Tsukiji         29/26R
   4,118,844   10/1978   Matsuzaki       29/26R
   6,227,082   5/2001    Hormansdorfer   82/1.11 --.

Column 3,
Line 55, after "6a and" delete "11a" and insert -- 11b --.

Column 4,
Line 32, delete
"List of reference numbers
1   workpiece spindle
2   axis of rotation of workpiece
3   carriage
4   tool spindle
5   axis of rotation of tool spindle
6   tool carrier
6a  lateral surface

UNITED STATES PATENT AND TRADEMARK OFFICE
CERTIFICATE OF CORRECTION

PATENT NO.   : 6,428,253 B1
DATED        : August 6, 2002
INVENTOR(S)  : Guido Kochsiek It is certified that error appears in the above-identified patent and that said Letters Patent is hereby corrected as shown below:

Column 4 (cont'd),
7   tool
8   axis of rotation of tool carrier
9   housing
10  quick-change system
11  pivot piston
11a end face
11b lateral surface
12  cylinder chamber
12a compartment
12b compartment
13  measuring system
14  pressure sleeve".

Signed and Sealed this

Twenty-first Day of March, 2006

JON W. DUDAS
*Director of the United States Patent and Trademark Office*